(12) United States Patent
Miller

(10) Patent No.: US 7,147,689 B1
(45) Date of Patent: Dec. 12, 2006

(54) APPARATUS AND METHOD FOR REMOVING VOLATILE ORGANICS FROM VENTED GASES

(76) Inventor: Charles K. Miller, P.O. Box 5233, 600 Flato Rd., Corpus Christi, TX (US) 78405

( * ) Notice: Subject to any disclaimer, the term of this patent is extended or adjusted under 35 U.S.C. 154(b) by 108 days.

(21) Appl. No.: 10/836,393

(22) Filed: Apr. 30, 2004

(51) Int. Cl.
*B01D 53/14* (2006.01)

(52) U.S. Cl. .............. 95/92; 95/154; 95/211; 95/237; 96/290; 96/355; 280/838

(58) Field of Classification Search .......... 95/92, 95/94, 143, 154, 211, 237; 96/134, 290, 96/355; 55/385.4; 280/837, 838, 839
See application file for complete search history.

(56) References Cited

U.S. PATENT DOCUMENTS

| | | | |
|---|---|---|---|
| 3,302,372 A | 2/1967 | Hynson et al. | |
| 3,445,182 A | 5/1969 | Tomany | |
| 3,778,968 A * | 12/1973 | Parker, Sr. ............ | 95/15 |
| 3,907,524 A * | 9/1975 | Haines, Jr. ............ | 95/192 |
| 3,936,281 A | 2/1976 | Kurmeier | |
| 3,981,156 A * | 9/1976 | Modisette et al. ...... | 62/48.2 |
| 4,343,629 A * | 8/1982 | Dinsmore et al. ...... | 95/93 |
| 4,475,928 A * | 10/1984 | Jacobsen ............... | 95/17 |
| 4,948,402 A | 8/1990 | Davis | |
| 5,080,696 A | 1/1992 | Marchand et al. | |
| 5,330,725 A | 7/1994 | Mumalo | |
| RE35,234 E | 5/1996 | Davis | |
| 5,529,612 A * | 6/1996 | Troost ................. | 95/184 |
| 5,634,962 A * | 6/1997 | Trahan et al. ......... | 95/158 |
| 5,733,515 A | 3/1998 | Doughty et al. | |
| 5,862,819 A * | 1/1999 | Cradeur ............... | 134/61 |
| 5,871,568 A * | 2/1999 | Gibson ................ | 96/122 |
| 5,897,690 A * | 4/1999 | McGrew ............... | 95/188 |
| 5,955,037 A | 9/1999 | Holst et al. | |
| 5,996,171 A | 12/1999 | Bowers | |
| 6,174,498 B1 | 1/2001 | Jain et al. | |
| 6,391,621 B1 | 5/2002 | Naruse | |
| 2004/0221718 A1 * | 11/2004 | Grodal ................ | 95/90 |

\* cited by examiner

*Primary Examiner*—Frank M. Lawrence
(74) *Attorney, Agent, or Firm*—Kean, Miller, Hawthorne, D'Armond, McCowan & Jarman, LLP

(57) ABSTRACT

An apparatus and a method for removing volatile organic compounds from air that is vented from tanks and vessels containing hydrocarbon material. This invention also relates to a self-propelled vehicle on which the apparatus is mounted.

15 Claims, 3 Drawing Sheets

APPARATUS AND METHOD FOR REMOVING VOLATILE ORGANICS FROM VENTED GASES

FIELD OF THE INVENTION

The present invention relates to an apparatus and a method for removing volatile organic compounds from air that is vented from tanks and vessels containing hydrocarbon material. This invention also relates to a self-propelled vehicle on which the apparatus is mounted.

BACKGROUND OF THE INVENTION

Federal, state and local environmental laws require significant reduction of discharge of harmful volatile organic compounds (VOCs) into the atmosphere. Many of these VOCs are known, or suspected, to cause cancer or other serious health effects. They are also often harmful to the environment. Non-limiting examples of VOCs include benzene, which is found in gasoline; perchlorethylene, which is emitted from some dry cleaning facilities; and methylene chloride, which is used as a solvent and paint stripper by a number of industries.

Most of these VOCs come from human-made sources, including mobile sources (e.g. cars, trucks, buses), stationary sources (e.g. factories, refineries, power plants, etc.), as well as indoor sources (e.g. some building materials and cleaning solvents). Great strides have been made in reducing the level of VOCs from industrial and commercial sources, particularly from large stationary sources such as chemical plants, oil refineries, aerospace manufacturers, steel mills, and paper mills. Great strides have also been made in reducing the level of benzene and toluene that are released with exhaust from automobiles and trucks. Although substantial progress has been made to reduce the level of VOCs from high volume industrial and commercial sources, there still remains a need to reduce the release of VOCs from the myriad lower volume sources, such as tanks used to transfer and/or store hydrocarbon liquids. One example of such a tank is the so-called "frac" tank that is typically used for on-site temporary storage of liquid hydrocarbons. Another example of such a tank is the tank mounted on a so-called "vacuum truck" that has various uses, such as for chemical cleanup and the transfer and transport of hydrocarbon liquids. During the transfer of hydrocarbon liquids into and out of such tanks, some of the hydrocarbon will vaporize, and if not prevented, will enter the atmosphere with air that is vented, such as when the tank is being filled with a liquid organic material. While a single tank would not represent a large release of VOCs, the cumulative effect of many such tanks would represent a substantial release of VOCs unless such VOCs were extracted from the air before being vented into the atmosphere.

VOCs are conventionally captured from such sources by passing the vented gaseous stream through one or more canisters containing a bed of sorbent material, such as activated carbon. The problem with such as technique is that, because of the substantial amount of VOCs in the vent gas, the carbon material quickly becomes spent, thus requiring frequent change-out and/or regeneration of the carbon bed.

Therefore, there remains a need in the art for equipment and methods for removing VOCs from gases, typically air, that are being vented into the atmosphere from various holding tanks, both stationary and mobile.

SUMMARY OF THE INVENTION

In accordance with the present invention, there is provided an apparatus for storing hydrocarbons materials with substantially zero release of VOCs into the atmosphere from said apparatus, which apparatus is comprised of:

a) a tank enclosed on all sides defining a chamber for holding a hydrocarbon material, said tank having an inlet for conducting a hydrocarbon material into said tank and an outlet for venting gases from said tank;

b) a scrubber unit comprised of enclosing walls defining a lower chamber and an upper chamber, which upper chamber, is in fluid communication with said lower chamber, which upper chamber is vertically elongated with respect to said lower chamber, wherein there is also provided: i) a bed of packing material contained in said upper chamber; ii) a liquid chemical agent contained in said lower chamber which chemical agent is selected from those in which the targeted VOCs are soluble, miscible, or both; iii) a first conduit fluidly connecting said lower chamber at a point below the level of chemical agent to said upper chamber at a point above said packing material; iv) a pump in-line of said first conduit for pumping chemical agent through said first conduit from said lower chamber to said upper chamber; v) an inlet port on said upper chamber at a point below said bed of packing material to allow the entry of a gaseous stream from said tank; vi) a second conduit fluidly connected to said outlet of said tank; vii) an outlet port in said upper chamber at a point above the point at which said first conduit is connected above the packing material.

In a preferred embodiment, the liquid chemical agent contained in said lower chamber is a surfactant.

In another preferred embodiment, the packing material is a ceramic material having an effective shape to allow passage of a liquid stream and of sufficient surface area to allow an effective residence time for up-flowing vent gas to contact down-flowing chemical agent.

In still another preferred embodiment, the upper chamber contains a separation device for separating liquid and particulates from the vent gas stream, which separation device is located between the top of the bed of packing material and the outlet port of the upper chamber.

In yet another preferred embodiment of the present invention the vent gas stream, after exiting the upper chamber is conducted to a polishing step wherein it is contacted with an effective sorbent.

In still another preferred embodiment the sorbent is selected from the group consisting of activated carbons, coke, zeolites, and ceramic honeycomb structures.

In another preferred embodiment the apparatus of the present invention is mounted on a self propelled vehicle.

Also in accordance with the present invention, there is provided a method for storing a hydrocarbon material, with substantially zero release of volatile organic compounds into the atmosphere, which process comprises:

conducting a hydrocarbon material into a vessel wherein at least a portion of the hydrocarbon material vaporizes and mixes with air in said vessel;

venting the air and hydrocarbon mixture to a scrubbing unit wherein it flows upward and countercurrent to a down-flowing liquid chemical agent in which said VOCs are substantially soluble, miscible, or both, and contacts said chemical agent on the surfaces of a packing material wherein at least a portion of said VOCs are transferred to said down-flowing chemical agent;

venting the resulting scrubbed vent gas stream, that is substantially free of VOCs, into the atmosphere; and collecting said down-flowing chemical agent in a reservoir for recycle.

DETAILED DESCRIPTION OF THE INVENTION

The present invention is primarily concerned with preventing the release of volatile organic compounds (VOCs) with vent gases from tanks and vessels being filled with, or containing, stored hydrocarbon material. The present invention preferably relates to tanks and vessels that are being filled with a volatile hydrocarbon liquid material, such as transportation fuels, organic solvents, and the like. Non-limiting examples of VOCs that the practice of the present invention can capture include light aliphatic gases such as butane and propane, as well as other organics such as benzene, hexane, toluene, xylene, and amines. During filling, either by pumping the hydrocarbon material into the tank, or by pulling a vacuum on the tank and sucking the hydrocarbon material into the tank, some of the hydrocarbon material will vaporize and if not captured, will escape into the atmosphere with the venting of air from the tank that is being displaced by the hydrocarbon liquid. Although it is preferred that the hydrocarbon material stored in the tank or vessel be a liquid at ambient temperature, it is within the scope of this invention that the hydrocarbon material can be in the vapor state.

Figure 1:
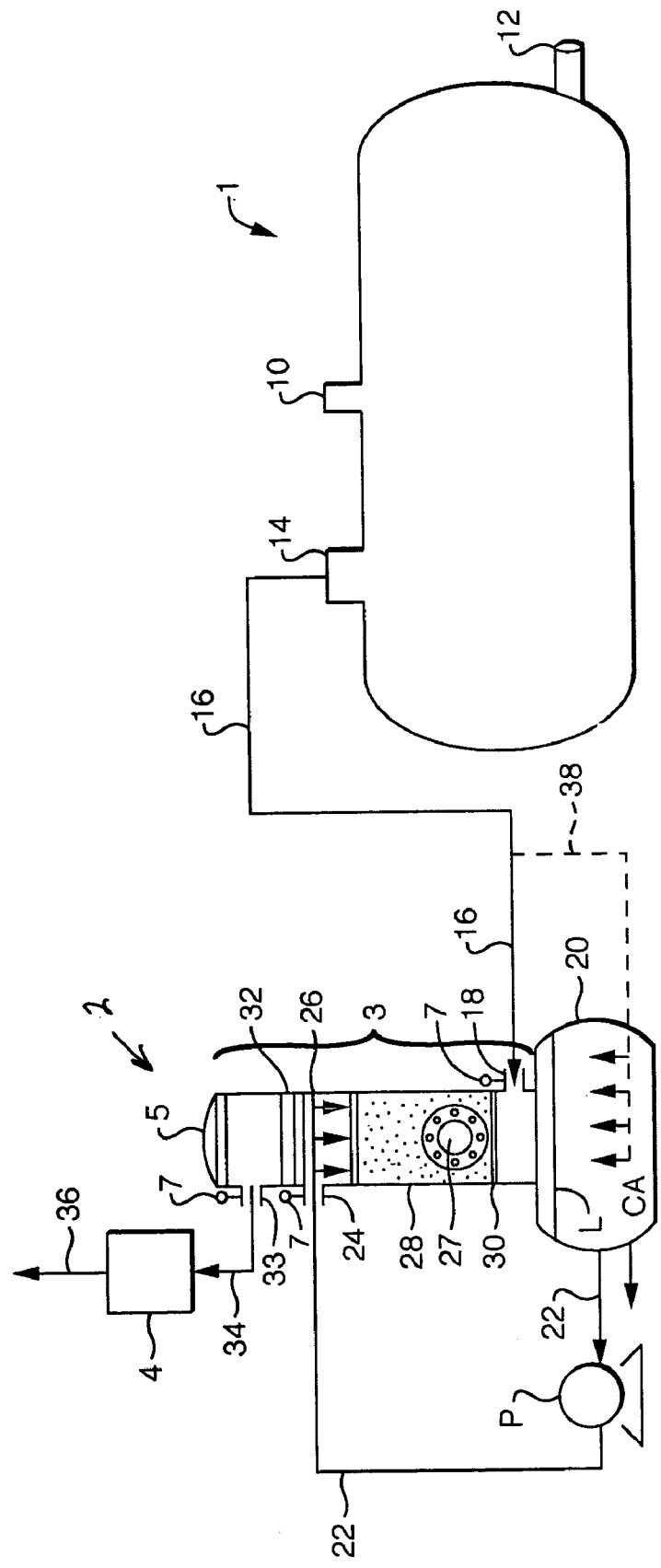
FIG. 1 hereof is a schematic representation of one preferred storage tank system of the present invention.

VOCs are prevented from entering the atmosphere by use of the novel apparatus of the present invention. FIG. 1 hereof presents a preferred tank system of the present invention. Ancillary equipment, such as valves, switches, power sources, and compressors, are not presented in this figure for the sake of clarity. One having ordinary skill in the art will be able to duplicate the present invention by what is presented in the disclosure and figures. FIG. 1 hereof shows a tank 1 having an inlet port 10 for receiving the hydrocarbon material, preferably a liquid hydrocarbon material. Outlet port 12 is provided for emptying tank 1. Outlet port 14 serves as a vent for tank 1. The vent can be used for venting displaced air contaminated with VOCs as the tank is being filled, or it can be used to vent gases from a tank used to store hydrocarbon material when the pressure within the tank reaches an undesirable level. That is, even when tank 1 is used for only storage, ambient temperatures may cause the hydrocarbon material to excessively vaporize, thereby requiring that some of it be removed via outlet port 14 to lower the pressure to a desirable level. Tank 1 can be fabricated from any construction material suitable for its intended use. It is preferred that tank 1 be fabricated from a stainless steel.

The vent gas will exit tank 1 via outlet port 14 and be conducted via line 16 to inlet 18 of upper chamber 3 of scrubber 2 at a point below a bed of packing material 28. Upper chamber 3 will preferably also contain a removable top 5. The vent gas will flow upward counter to down-flowing chemical agent CA that is pumped via recirculating pump P through line 22 from lower chamber 20 containing a reservoir of an effective chemical agent having a level L. Chemical agent CA will enter near the top of upper chamber 3 at inlet 24 and be distributed by way of a suitable liquid distribution device 26, such as a distribution, or sieve tray. Inlet port 24 will be at a point above the distribution device 26 and the bed of packing material 28. Any suitable liquid distribution device can be used as long it is capable of distributing the chemical agents substantially uniformly at the top of the upper chamber just about the bed of packing material 28 which is supported by a suitable supporting means 30, which may also be a sieve tray or a grid having openings smaller than the size of the particles of packing material. Inlet port 24, inlet port 18, and outlet port 33 will optionally be fitted with a suitable conventional pressure/vacuum gauge 7.

The chemical agent will be one that has a relatively high solubility for the target VOC contaminants in the vented gaseous (air) stream. The targeted VOC contaminants will migrate from the upflowing vent gas to the downflowing liquid chemical agent. It is within the scope of the present invention that the chemical agent contain a reactive solute capable of enhancing the degree of absorption or solubility by reacting with the VOC contaminant once it dissolves and effectively chemically removes it. The chemical agent will be such that as it countercurrently passes and contacts the vent gas/VOC stream on the surfaces of the packing material, it will absorb a substantial portion, preferably substantially all, of the target VOCs from the vent gas/VOC stream. The particular chemical agent used will be dependent on the particular target VOC(s).

It is preferred that the chemical agent be a surfactant in an aqueous medium. Any suitable surfactant can be used as long as it is capable of sorbing the target VOCs. Non-limiting examples of surfactants suitable for use herein include non-ionic surfactants, cationic surfactants, anionic surfactants, and hydrotropic surfactants. Most preferred are non-ionic surfactants. Non-limiting examples of suitable nonionic surfactants that can be used in the practice of the present invention include those selected from the group consisting of alkanolamides, alkanolamines, amine oxides, carboxylic acids, carboxylic fatty acids and carboxylic acid esters, carboxylated alcohols, carboxylated alkylphenols, carboxylated alkylphenol ethoxylates, glycols and glycol esters, ethoxylated and propoxylated glycols and glycol esters, glycerol and glycerol esters, ethoxylated and propoxylated glycerol and glycerol esters, ethoxylated and propoxylated alcohols including ethoxylated and propoxylated primary linear $C_4$ to $C_{20}$+ alcohols, ethoxylated and propoxylated alkylphenols, ethoxylated and propoxylated dodecyl phenols, ethoxylated and propoxylated octyl phenols, ethoxylated and propoxylated nonyl phenols, polyethylene glycols of all molecular weights and reactions, polypropylene glycols of all molecular weights and reactions, glutamic acid and glutamic acid esters, lanolin and lanolin esters, lecithin and lecithin derivatives, monoglycerides, oxazoline and ethoxylated oxazoline derivatives, sorbitan and sorbitan derivatives, soaps of tall oil rosins and fatty acids, sucrose and glucose esters and derivatives, thio and mercapto derivatives, and mixtures thereof.

Non-limiting examples of suitable anionic surfactants suitable for use herein include those selected from the group consisting of alkyl sulfates, alkyl ether sulfates, alkylaryl sulfates, alkyl sulfonates, olefin sulfonates including the alpha olefin sulfonates, alkyl ester sulfonates, alkylaryl sulfonates, including the linear and branched alkyl benzene sulfonates and the linear and branched dodecylbenzene sulfonates, alkyl benzenes, sulfonated amides, sulfonated amines, diphenyl sulfonate derivatives, maleic and succinic anhydrides, phosphate esters, phosphorous organic derivatives, sarcosine derivatives, sulfates and sulfonates of oils and fatty acids, sulfates and sulfonates of alcohols and ethoxylated and propoxylated alcohols, alcohol ether sulfates, sulfates and sulfonates of fatty esters, sulfates and sulfonates of ethoxylated and propoxylated alkylphenols including ethoxylated and propoxylated sulfated nonly phenols, sulfated octyl phenols, ethoxylated and propoxylated sulfated octly phenols, sulfated dodecyl phenols, and ethoxylated and propoxylated sulfated dodecyl phenols, sulfonates of benzene, cumene, toluene and xylene, sulfonates of condensed naphthalenes, sulfonates of dodecyl and tridecylbenzenes, sulfonates of naphthalene and alkyl naphthalene, sulfonates of petroleum, sulfosuccinamates, sulfosuccinates and derivatives thereof, and tridecyl and dodecyl benzene sulfonic acids, and mixtures thereof.

Non-limiting examples of hydrotropic surfactants that can be used in the present invention include those selected from the group consisting of dicarboxylic acids and acid esters, phosphate esters, sodium xylene sulfonate, sodium dodecyl diphenyl ether disulfonate, and maleic and succinic anhydrides, and mixtures thereof.

The packing material can be any suitable packing material conventionally used in processes such as wet gas scrubbing. The packing material provides the necessary surface area and turbulence to achieve the desired contact residence time and subsequent removal of VOC contaminants. It is preferred that the packing material be substantially inert with respect to the chemical agent and target VOCs. Non-limiting examples of suitable packing materials include ceramic and polymeric structures of any suitable shape. Such shapes can include balls, saddles, and tri-lobes. The packing material will be packed so that there is enough void space for liquid chemical agent to flow downward while the vent gas stream to be scrubbed flows upward.

It is preferred that upper chamber 3 contain a separation or filtering device 32 to remove any small amounts of particulates and liquid droplets that may be entrained in the scrubbed vent gas stream before it exits upper chamber 3 via line 34. Such devices are sometimes referred to as demisters or diffusers and are generally comprised of porous mesh or woven metal (stainless steel), ceramic, or polymeric material to allow the passage of vapor but not liquid or particulates. It is preferred, but optional, that the scrubbed vent gas, as it leaves upper chamber 3 via line 34 pass through one or more beds of solid sorbent material 4 to remove at least a portion of any remaining amounts of VOCs that may still be present in the treated vent gas stream so that vented stream 36 will be substantially free of VOCs. Any suitable sorbent material can be used. The sorbent material will be contained in suitable containers, preferably metal containers of appropriate size for the volume of gas that will pass there-through. Non-limiting examples of suitable sorbent materials include activated carbons, coke, zeolite materials, aluminas, and the like. The resulting pollutant-free vent gas stream can then be released to the atmosphere via line 36.

It is within the scope of the present invention that the vented gaseous stream in line 16 be either split so that a fraction of it is conducted via line 38 to chemical agent reservoir in lower chamber 20 so that it passes through the chemical agent in the reservoir prior to being conducted to upper chamber 3 where it will flow upward countercurrent to the down-flowing chemical agent. It is also within the scope of the present invention that the entire vent gas stream be directed to chemical agent reservoir 20 via line 38. There is also provided a clean-out plug, or door, 27 for removing packing material from the upper chamber.

Figure 2:
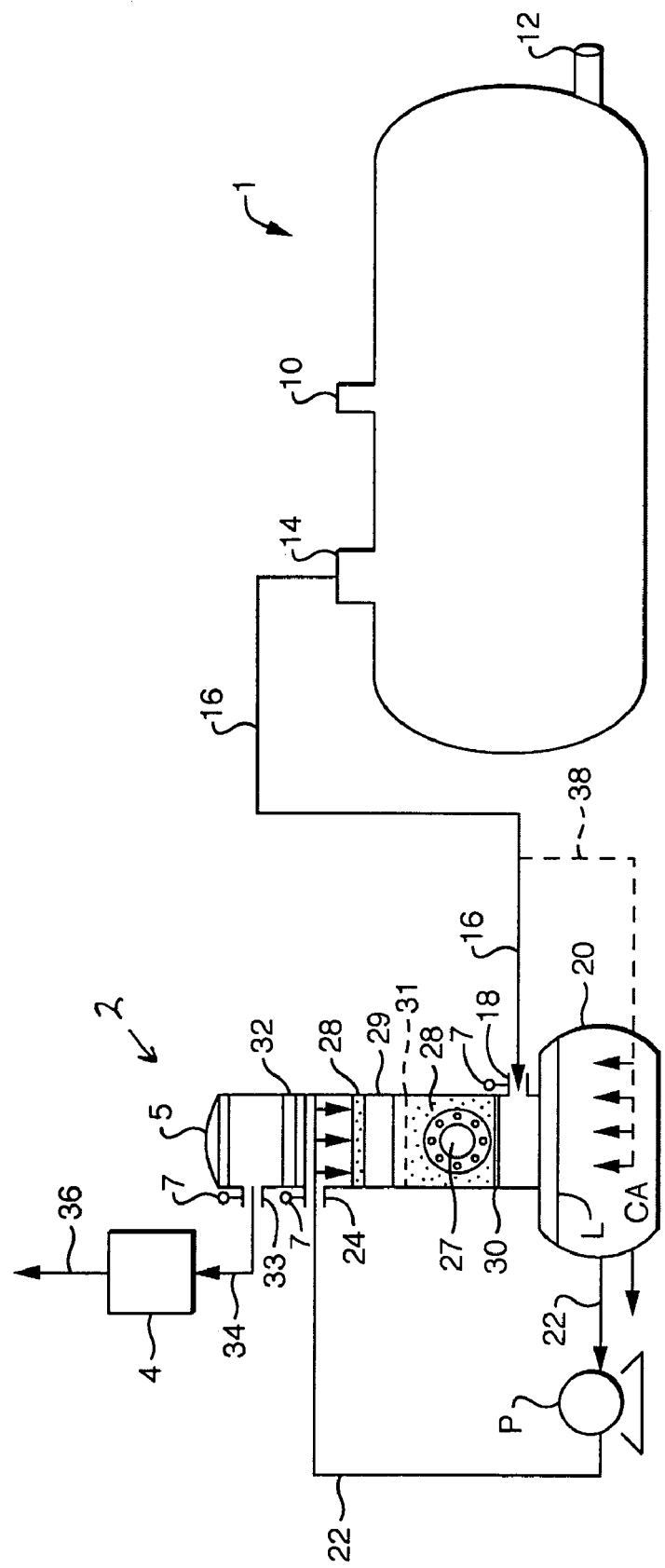
FIG. 2 hereof is a schematic representation of another preferred storage tank systems of the present invention.

FIG. 2 hereof shows substantially the same apparatus as FIG. 1 except there is provided, in upper chamber 3, a distribution/defoaming device 29, that is preferably a stainless steel mesh or screen of suitable thickness for the intended use. Device 29 helps the distribution of down-flowing chemical agent and also helps mitigate any foaming that may take occur in upper chamber 3. It is within the scope to this invention to use one or more conventional defoaming agents with the chemical agent.

Figure 3:
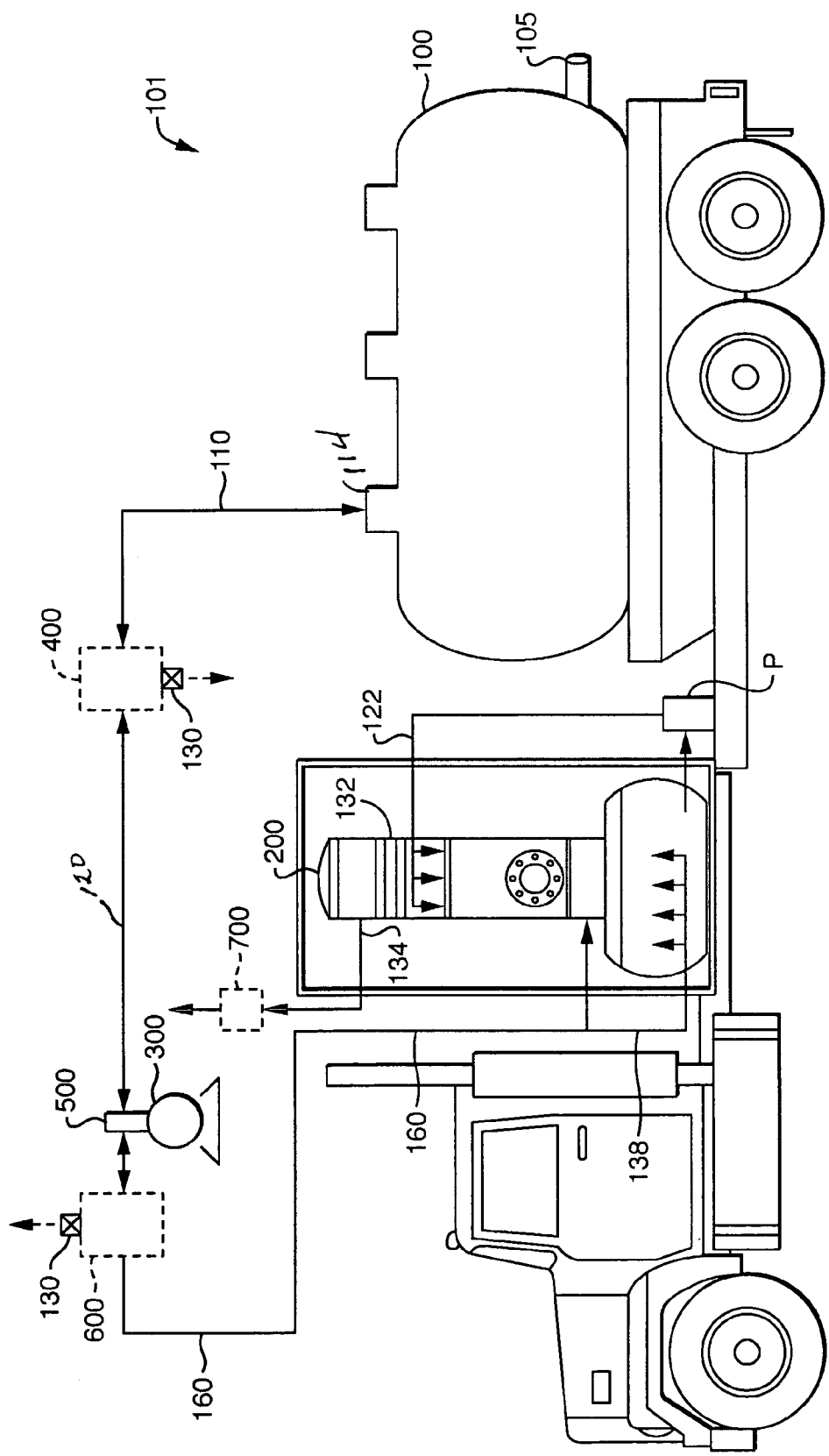
FIG. 3 hereof is a schematic representation of a preferred storage tank system of the present invention as an integral part of a self propelled vehicle.

FIG. 3 hereof illustrates a preferred embodiment of the present wherein the apparatus of the present is an integral part of a self propelled vehicle, preferably vacuum truck used to vacuum hydrocarbon material, preferably a hydrocarbon liquid into the tank for temporary storage. Truck 101 contains a holding tank 100, a scrubbing unit 200, a vacuum pump 300, optionally canisters 400 and 600, a multi-position valve 500 for directing the vacuum from vacuum pump 300, optionally a bed of sorbent material 700, and valves 130 for draining canisters 400 and 600. Canisters 400 and 600 are optionally provided to remove tramp amount of contaminants, such as any unwanted moisture, particulates, or pump oil from the line. These canisters will also be provided with a float, not shown, that will shut the system down should the canisters become filled with liquid.

In one mode of operation, multi-position valve 500 is positioned so that vacuum pump 300 pulls air out of tank 100 via valve 500 and lines 110, and 120. In operation, the vacuum created in tank 100 is used to suck hydrocarbon material into the tank via line 105 which will typically be a flexible hose of suitable composition and length for its intended purpose. As the tank is filling with hydrocarbon material, preferably a hydrocarbon liquid, air in the tank will become contaminated with hydrocarbon vapor and will be vented from tank 100 at outlet port 114 via lines 110 and 120 to inlet port of scrubbing unit 200 via line 160. Scrubbing unit 200 is the same as that described for FIG. 1 hereof and every feature described in FIG. 1 will not be repeated for this FIG. 3. The scrubbed vent gas will exit the scrubbing unit via line 134 and preferably pass through one or more sorbent beds 700 that will typically be canisters filled with an activated carbon. This will remove any small amounts of VOCs that may still be present in vent gas stream 134. Valves 130 on canisters 400 and 600 are for draining the canister of trapped water, particulates, oil, etc. It is preferred that the valve be on the underside of the canisters. Lines 120 and 110 are reversible in that valve 500 can be switched in such a way that the vacuum is reversed and air, or some other material, is pumped into tank 100 to aid in emptying the tank.

While the foregoing specification sets forth preferred embodiments of the present invention for the purposes of illustrating the present invention, it will be understood that such embodiments may be widely varied by those having skill in the art without departing from the spirit or of the present invention.

What is claimed is:

1. An apparatus for storing hydrocarbons with substantially zero release of volatile organic compounds (VOCs) into the atmosphere, which system is comprised of:

a) a tank, wherein the tank bounds an interior area for holding a hydrocarbon material, said tank having an inlet for conducting a hydrocarbon material into said tank and an outlet for venting gases from said tank;
b) a scrubber unit comprised of enclosing walls defining a lower chamber and an upper chamber, which upper chamber, is in fluid communication with said lower chamber, which upper chamber is vertically elongated with respect to said lower chamber, wherein there is also provided: i) a bed of substantially inert packing material contained in said upper chamber, wherein within said bed of packing material there provided a defoaming device comprised of a stainless steel screen which defoaming device is perpendicular to the longitudinal axis of the upper chamber, which defoaming device is cylindrical in shape and is defined by the enclosing walls of the upper chamber and an interface with the packing material at the top and bottom of said defoaming device; ii) a liquid chemical agent, comprised of a surfactant in an aqueous medium, contained in said lower chamber which chemical agent is selected from those in which the targeted VOCs are soluble, miscible, or both; iii) a first conduit fluidly connecting said lower chamber at a point below the level of chemical agent to said upper chamber at a point above said packing material; iv) a pump in-line of said first conduit for pumping chemical agent through said first conduit from said lower chamber to said upper chamber; v) an inlet port on said upper chamber at a point below said bed of packing material to allow the entry of a gaseous stream from said tank; vi) a second conduit fluidly connected to said outlet of said tank and said inlet port of said upper chamber; vii) an outlet port in said upper chamber at a point above the point at which said first conduit is connected above the packing material, and wherein there is also provided a separation device for separating liquid and particulates from the gaseous stream, which separation device is located between the outlet of said upper chamber and the point at which chemical agent is injected.

2. The apparatus of claim 1 wherein the packing material is comprised of ceramic shapes having an effective surface area that would allow sufficient contact of the upflowing stream and a down-flowing liquid stream.

3. The apparatus of claim 1 wherein there is provided a vessel containing a sorbent effective for sorbing volatile organic compounds.

4. The apparatus of claim 3 wherein the sorbent is selected from the group consisting of activated carbons, coke, zeolites, and ceramic honeycone structures.

5. The apparatus of claim 1 wherein it is mounted on a self propelled vehicle.

6. An apparatus comprising:
a) a self propelled vehicle;
b) a tank mounted on said vehicle, wherein the tank bounds an interior area for holding a hydrocarbon material, said tank having an inlet for conducting a hydrocarbon material into said tank and an outlet for venting gases from said tank;
b) a scrubber unit comprised of enclosing walls defining a lower chamber and an upper chamber, which upper chamber, is in fluid communication with said lower chamber, which upper chamber is vertically elongated with respect to said lower chamber, wherein there is also provided: i) a bed of substantially inert packing material contained in said upper chamber, wherein within said bed of packing material there provided a defoaming device comprised of a stainless steel screen which defoaming device is perpendicular to the longitudinal axis of the upper chamber, which defoaming device is cylindrical in shape and is defined by the enclosing walls of the upper chamber and an interface with the packing material at the top and bottom of said defoaming device; ii) a liquid chemical agent, comprised of a surfactant in an aqueous medium, contained in said lower chamber which chemical agent is selected from those in which the targeted VOCs are soluble, miscible, or both; iii) a first conduit fluidly connecting said lower chamber at a point below the level of chemical agent to said upper chamber at a point above said packing material; iv) a pump in-line of said first conduit for pumping chemical agent through said first conduit from said lower chamber to said upper chamber; v) an inlet port on said upper chamber at a point below said bed of packing material to allow the entry of a gaseous stream from said tank; vi) a second conduit fluidly connected to said outlet of said tank and said inlet port of said upper chamber; vii) an outlet port in said upper chamber at a point above the point at which said first conduit is connected above the packing material, and wherein there is also provided a separation device for separating liquid and particulates from the gaseous stream, which separation device is located between the outlet of said upper chamber and the point at which chemical agent is injected.

7. The apparatus of claim 6 wherein the packing material is comprised of ceramic shapes having an effective surface area that would allow sufficient contact of the vent gas stream with the down-flowing shape to allow passage of a liquid stream.

8. The apparatus of claim 6 wherein there is provided a vessel containing a sorbent effective for sorbing VOCS from a gaseous stream fluidly connected to said outlet of said upper chamber.

9. The apparatus of claim 8 wherein the sorbent is selected from the group consisting of activated carbons and coke, zeolites, and ceramic honeycone structures.

10. A method for transferring a hydrocarbon material to a container and venting displaced gases in said container with substantially no release of volatile organic compounds into the atmosphere, which method comprises:
conducting a hydrocarbon material into a container thereby replacing at least a portion of gas in said container and wherein a portion of said hydrocarbon material vaporized to contaminate said gas with volatile organic compounds;
conducting at least a portion of said gas contaminated with volatile organic compounds of said container into a contacting zone wherein said gases contaminated with volatile organic compounds flow through a chamber countercurrent to a down-flowing liquid chemical agent, which chemical agent is, comprised of a surfactant in an aqueous medium and is one in which said volatile organic compounds are at least partially soluble, miscible, or both thereby transferring at least a portion of said volatile organic compounds from said up-flowing gaseous stream to said down-flowing chemical agent stream, wherein said chamber is oriented in a vertical position with respect to a reservoir of chemical agent and wherein said chamber contains a bed substantially inert of packing material comprised of a ceramic of a shape to provide the effective residence time for the up-flowing gas stream to contact the down-flowing liquid chemical stream to allow transfer of at least a portion of the volatile organic compounds from the gaseous stream to the liquid stream, wherein solid particles of said packing material are of sufficient size to allow passage of the liquid chemical agent stream;

venting said gas, which are now substantially reduced in volatile organic compounds, into the atmosphere; and collecting said chemical agent into a storage vessel for recycle.

11. The method of claim 10 wherein the solid particles are of a shape selected from the group consisting of ball, saddles, and tri-lobes.

12. The method of claim 10, wherein the surfactant is selected from the group consisting of non-ionic surfactants, cationic surfactants, anionic surfactants, and hydrotropic surfactants.

13. The method of claim 12 wherein the surfactant is a non-ionic surfactant.

14. The method of claim 10 wherein the vented gas stream is passed through at least one bed of sorbent material to remove at least a portion of any remaining volatile organic compounds.

15. The method of claim 14 wherein the sorbent material is selected from the group consisting of activated carbon, coke, and zeolites.

* * * * *